US012540875B1

(12) United States Patent
Maciolek et al.

(10) Patent No.: US 12,540,875 B1
(45) Date of Patent: Feb. 3, 2026

(54) SYSTEMS AND METHODS FOR DETECTING LEAKING PIPES

(71) Applicant: UIPCO, LLC, San Antonio, TX (US)

(72) Inventors: Michael J. Maciolek, Kerrville, TX (US); Donnette L. Moncrief Brown, San Antonio, TX (US); Manfred Amann, San Antonio, TX (US); Timothy Frank Davison, San Antonio, TX (US); Snehal Desai, Richardson, TX (US); Nicole Ferretti, Plano, TX (US); Rachel Michelle Ballew, San Antonio, TX (US); Chung Shing Sheldon Lee, South Jordan, UT (US); Martin Lopez, Frisco, TX (US); Kelsey Anne O'Brien, Austin, TX (US); Melissa Jane Porter, Lutz, FL (US); Sayeef Rahim, Allen, TX (US); Eric David Schroeder, San Antonio, TX (US); Steven J. Schroeder, Oak Point, TX (US); Joseph Michael Vesco, Sparks, NV (US)

(73) Assignee: United Services Automobile Association (USAA), San Antonio, TX (US)

( * ) Notice: Subject to any disclaimer, the term of this patent is extended or adjusted under 35 U.S.C. 154(b) by 314 days.

(21) Appl. No.: 18/308,024

(22) Filed: Apr. 27, 2023

Related U.S. Application Data

(60) Provisional application No. 63/335,800, filed on Apr. 28, 2022.

(51) Int. Cl.
*G01M 3/22* (2006.01)
*F17D 5/02* (2006.01)

(52) U.S. Cl.
CPC ............... *G01M 3/22* (2013.01); *F17D 5/02* (2013.01)

(58) Field of Classification Search
None
See application file for complete search history.

(56) References Cited

U.S. PATENT DOCUMENTS

| | | | | | |
|---|---|---|---|---|---|
| 1,693,737 | A | * | 12/1928 | Weldon | G01M 3/04 73/40.7 |
| 4,580,442 | A | * | 4/1986 | Jones | G01M 3/20 73/40 |
| 2004/0118185 | A1 | * | 6/2004 | Duerr | G01M 3/226 73/104 |
| 2007/0051921 | A1 | * | 3/2007 | Miles | G01M 3/226 252/301.19 |

FOREIGN PATENT DOCUMENTS

| | | | | | |
|---|---|---|---|---|---|
| CN | 111536434 | A | * | 8/2020 | F17D 3/01 |
| CN | 215561236 | U | * | 1/2022 | |

* cited by examiner

*Primary Examiner* — Daniel S Larkin
(74) *Attorney, Agent, or Firm* — Plumsea Law Group, LLC (57) ABSTRACT

A system and method for identifying the sources of leaking water in a home or other facility. In particular, the embodiments provide devices that can dye water in a plumbing system to provide a visual indicator of water that has leaked from a pipe. These include manifold assemblies with integrated injection devices, as well as stand-alone injection devices that can be coupled to individual pipes and/or pipe connectors.

15 Claims, 8 Drawing Sheets

SYSTEMS AND METHODS FOR DETECTING LEAKING PIPES

CROSS-REFERENCE TO RELATED APPLICATIONS

This application claims the benefit of Provisional Patent Application No. 63/335,800 filed Apr. 28, 2022, and titled "Systems and Methods for Detecting Leaking Pipes," which is incorporated by reference herein in its entirety.

TECHNICAL FIELD

The present disclosure generally relates to systems and methods for detecting leaks in pipes.

BACKGROUND

Water damage to homes is one of the leading causes of insurance claims. Water damage can occur due to flooding, leaking roofs, leaking pipes, leaking appliances, or other causes. Often, upon spotting water damage in a home, it may be difficult to ascertain the source immediately. The longer the source goes unidentified, the more damage the leaking water can cause to a home, and the more costly repairs.

There is a need in the art for a system and method that addresses the shortcomings discussed above.

SUMMARY

In one aspect, a water pipe manifold assembly for use in a plumbing system includes a manifold body including an interior manifold cavity, a water inlet port in fluid communication with the interior manifold cavity, a first water outlet port in fluid communication with the interior manifold cavity, a second water outlet port in fluid communication with the interior manifold cavity, and a manifold injection device attached to the manifold body. The manifold injection device includes a reservoir filled with an aqueous solution including a dye and an injection assembly having a first end in fluid communication with the reservoir and a second end in fluid communication with the interior manifold cavity. The manifold injection device can inject the aqueous solution including the dye from the reservoir into the interior manifold cavity.

In another aspect, an injection device for use in a plumbing system, where the plumbing system includes a pipe having an interior pipe cavity, includes a reservoir filled with an aqueous solution including a dye, and an injection assembly having a first end in fluid communication with the reservoir and a second end in fluid communication with the interior pipe cavity of the pipe. The injection device can inject the aqueous solution including the dye from the reservoir into the interior pipe cavity.

In another aspect, a plumbing system includes a first pipe having a first interior pipe cavity and a second pipe having a second interior pipe cavity, a first injection device, and a second injection device. The first injection device has a first reservoir filled a first aqueous solution having a first dye and a first injection assembly in fluid communication with the first interior pipe cavity. The second injection device includes a second reservoir filled with a second aqueous solution having a second dye and a second injection assembly in fluid communication with the second interior pipe cavity. The first injection device can inject the first aqueous solution with the first dye from the first reservoir into the first interior pipe cavity. The second injection device can inject the second aqueous solution with the second dye from the second reservoir into the second interior pipe cavity. The first dye has a substantially different color than the second dye.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

The embodiments provide systems and methods for identifying the sources of leaking water in a home or other facility. In particular, the embodiments provide devices that can dye water in a plumbing system to provide a visual indicator of water that has leaked from a pipe. These devices include manifold assemblies with integrated injection devices, as well as stand-alone injection devices that can be coupled to individual pipes and/or pipe connectors.

In one embodiment, dye could be introduced into the pipes so that if a pipe leaks, the dye color would be transferred and visible where there are water stains on walls, floors, and/or ceilings. This allows someone to readily detect water from a leaking pipe vs water from another source (such as rainwater entering the house through a leaking roof or water leaking from an appliance, such as a refrigerator). In one embodiment, the dye could be introduced into pipes after water damage is detected to check if the leak is coming from a pipe or from another source.

In one embodiment, a home could have a manifold system for pipes that has an automated dye injection system that could be deployed manually at any time (or automatically at regular intervals). Thus, upon observing water stains, a homeowner could actuate the injection system at the manifold, releasing dye into the pipes so that the homeowner can observe if the water stain changes color, indicating a leaking pipe. In addition, using dye could help confirm that a leak is coming from a particular source, such as an appliance with leaking piping, rather than the plumbing system itself, which may help establish fault for water damage claims.

In some embodiments, different colored dyes could be used in different sections of pipe, to help narrow down likely sources of the leak.

Various terms and definitions are gathered here for convenience.

As used herein, the term "dye" refers to any soluble or non-soluble substance that can be used to color materials, including fluids, such as water. In the context of the embodiments where dyes may be introduced into the water supply of a home or other facility, it may be appreciated that the dyes can be manufactured to be ingestible and otherwise safe for human consumption and contact. As an example, food coloring is a safe and ingestible substance that can color water and other fluids. Moreover, dyes may be suspended in aqueous solutions for application. In some cases, the aqueous solution could be water, while in other cases other suitable aqueous solutions could be used. Thus, for convenience, the term "dye" may imply an aqueous solution that includes a dye.

As used herein, the term "plumbing system" refers to a set of pipes, pipe connectors, pipe manifolds, faucets, toilets, and other fixtures that provide water to components of a home or building, as well as a means for draining the water.

As used herein, the term "pipe manifold" (or simply "manifold") refers to a collection of pipes or a bound header that facilitates transferring water between different points in a plumbing system.

As used herein, the term "water line" refers to a conduit for transporting water. Water lines could be conventional pipes, such as metal pipes (for example, copper pipes), which are relatively rigid. Water lines could also be plastic pipes or tubing that may be flexible, such as tubing constructed of cross-linked polyethylene (PEX). For convenience, the embodiments use the term "pipe" to mean any piping or tubing that can be used to deliver water or other fluids, and which may be flexible or rigid.

Figure 1:
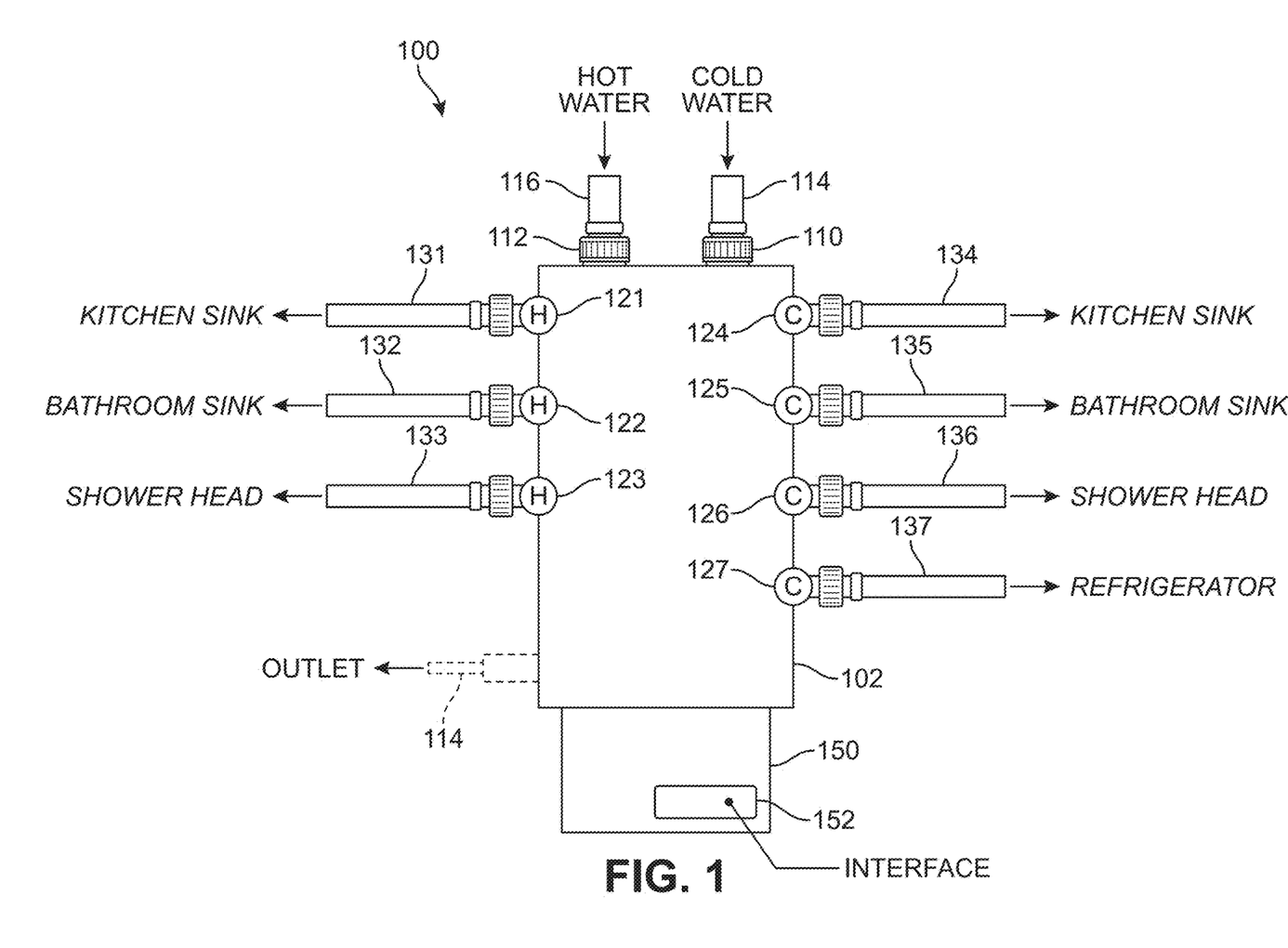
FIG. 1 is a schematic view of a water pipe manifold assembly, according to an embodiment.

FIG. 1 is a schematic view of a water pipe manifold assembly 100 (or simply "manifold assembly 100"). Manifold assembly 100 may be used with a plumbing system in a house. In particular, manifold assembly 100 may receive hot and/or cold water and disseminate the water through various outgoing pipes. Water in the outgoing pipes can then be delivered to various components associated with the plumbing system, such as, but not limited to: faucets, toilets, appliances, water hears, and other components using water in a building with a plumbing system.

Figure 2:
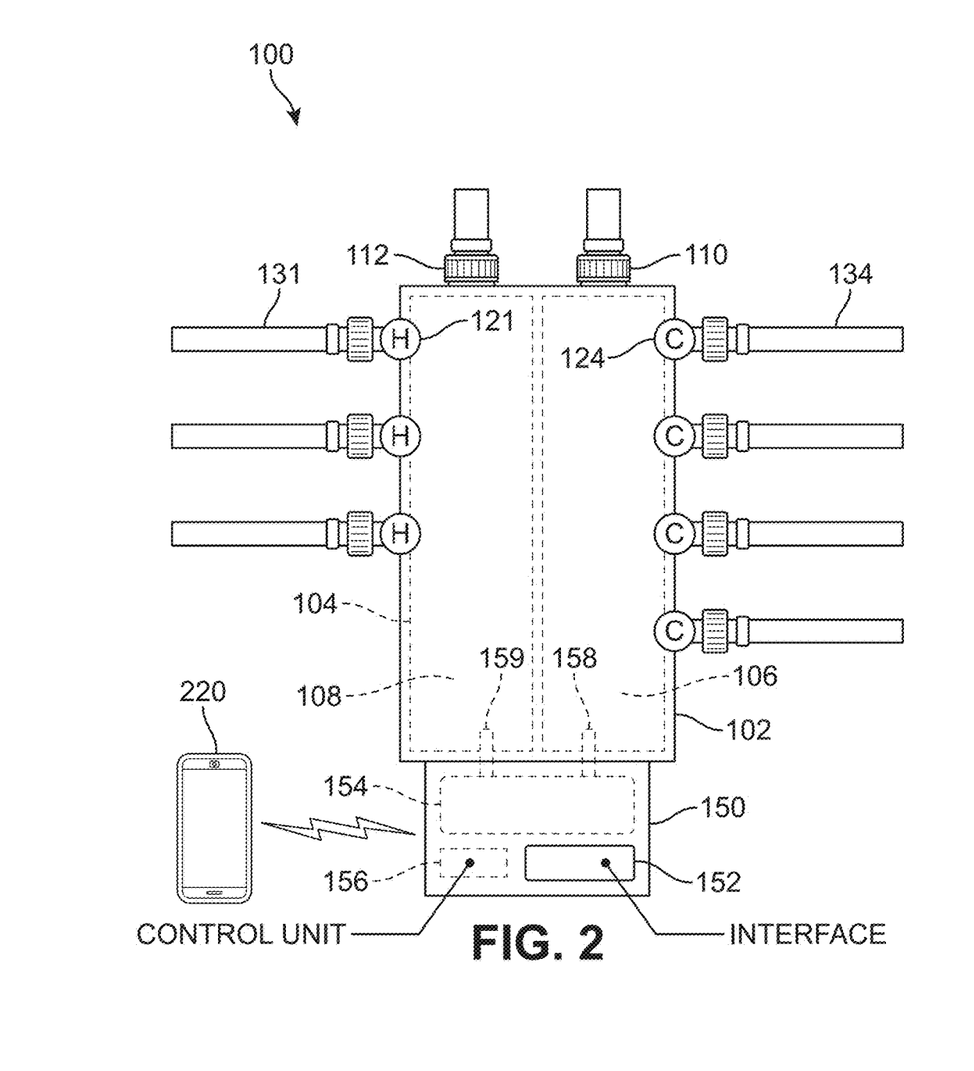
FIG. 2 is another schematic view of a water pipe manifold assembly, according to an embodiment.

Manifold assembly 100 further comprises a manifold body 102 with an interior manifold cavity 104 that can temporarily store a fluid (for example, water), as shown in FIG. 2. In the exemplary embodiment, interior manifold cavity 104 may be further divided into a cold-water cavity 106 and a hot-water cavity 108. That is, cold water and hot water are separately maintained within manifold and delivered to respective hot and cold-water pipes in the plumbing system, rather than mixed in a single manifold cavity. In embodiments using only cold (or hot) water, a single manifold cavity could be used.

Manifold assembly 100 can also include a plurality of fluid ports. As used herein, the term "fluid port" refers to a part of a manifold assembly that can be connected to a pipe for receiving fluid at, or dispensing fluid from, an interior manifold cavity. Fluid ports that facilitate delivering water to the manifold may be referred to as "inlet fluid ports" (or simply, "inlet ports") while fluid ports that facilitate dispensing water from the manifold to components of the plumbing system may be referred to as "outlet fluid ports" (or simply, "outlet ports").

Referring to FIG. 1, manifold body 102 may include a first inlet port 110 (connected to cold-water delivery pipe 114) and a second inlet port 112 (connected to hot-water delivery pipe 116). Water arriving through first inlet port 110 may pass through cold-water cavity 106, while water arriving through second inlet port 112 may pass through hot-water cavity 108.

Additionally, manifold body 102 includes various outlet ports. These include a set of cold-water outlet ports and a set of hot-water outlet ports. As seen in FIG. 1, the hot-water ports include first outlet port 121, a second outlet port 122, and a third outlet port 123. Each of these hot-water ports are connected to corresponding pipes for delivery to one or more components of the plumbing system. For example, first outlet port 121 is connected to first pipe 131 for delivering hot water to a kitchen sink. Second outlet port 122 is connected to second pipe 132 for delivering hot water to a bathroom sink. Third outlet port 123 is connected to third pipe 133 for delivering hot water to a shower head.

The cold-water ports include fourth outlet port 124, fifth outlet port 125, sixth outlet port 126, and seventh outlet port 127. Each of these cold-water ports are connected to corresponding pipes for delivery to one or more components of the plumbing system. For example, fourth outlet port 124 is connected to pipe 134 for delivering cold water to a kitchen sink. Fifth outlet port 125 is connected to pipe 135 for delivering cold water to a bathroom sink. Sixth outlet port 126 is connected to pipe 136 for delivering cold water to a shower head. And seventh outlet port 127 is connected to pipe 137 for delivering cold water to a refrigerator.

It may be appreciated that each fluid port can be further associated with a valve that allows the port to be opened and/or closed. In some cases, each of the ports described above may comprise a fluid valve. This allows water to different pipes to be shut off, without shutting off water to other pipes connected to the manifold. For example, a user could close a valve associated with fluid port 124 to shut off cold water to pipe 134 (and to the kitchen sink).

In some embodiments, manifold body 102 could also include another outlet port 114 (shown in phantom) that is used to deliver water to other systems and/or provide drainage. Although shown schematically in FIG. 1, outlet port 114 could be connected to either of hot-water cavity 108 or cold-water cavity 106.

In some embodiments, valves could be manually actuatable. For example, users may rotate a valve to open or close it. In other embodiments, the valves could be electromechanical valves that can be opened and closed via electromagnetic signals. Such configurations would allow the valves to be controlled remotely by a human operator or otherwise operated by an automated control system.

Manifold assembly 100 can also include an integrated injection device 150. As shown in FIG. 1, injection device 150 is attached to a bottom side of manifold body 102 in the exemplary embodiment. However, in other embodiments, injection device 150 could be attached at other suitable locations of manifold body 102.

Injection device 150 can be used to inject dye into the fluid (for example, water) within interior manifold cavity 104. This acts to dye the water within interior cavity 104 before (or as) it is dispensed to various pipes through one or more outlet ports. To this end, injection device 150 includes a reservoir 154 (as best seen in FIG. 2), which may be filled with an ingestible dye (or an aqueous solution with a dye), ingestible ink, or other substance for coloring water that is safe to ingest in sufficiently small quantities.

Injection device 150 can also include an injection assembly comprised of a first injector 158 and a second injector 159. Each injector is seen to be in fluid communication with reservoir 154 and with interior manifold cavity 104. More specifically, first injector 158 includes a first end that is in fluid communication with reservoir 154 and a second end that is in fluid communication with cold water cavity 106. Likewise, second injector 159 includes a first end that is in fluid communication with reservoir 154 and a second end that is in fluid communication with hot-water cavity 108. With this exemplary configuration, the injection assembly can be used to inject dye from reservoir 154 into each of cold water cavity 106 and hot-water cavity 108 simultaneously.

Injection device 150 may also include an electronic control unit 156 (or simply "control unit 156") as well as an interface 152. Control unit 156 may include processors, memory, and one or more networking components. The processors could comprise any suitable processors for injection device 150. For memory, any suitable non-transitory medium that can store instructions that are executable by the processors could be used. In addition, suitable networking components include any components for establishing wired or wireless connections with other systems, such as a smart phone 202 running an application for interfacing with injection device 150. The networking components could include radios and other circuits for connecting to devices over WiFi, or for enabling suitable local area networks or personal area networks.

In some embodiments, control unit 156 could be configured to communicate with a remote device. In the embodiment of FIG. 2, control unit 156 can communicate wirelessly with a smartphone 220. This connection could be done over Bluetooth, WiFi, or any other suitable wireless network. In some cases, smartphone 220 could run an application that provides an interface for remotely initiating the manifold injection system.

Interface 152 may comprise any suitable configuration of buttons, displays, and/or touchscreens. Interface 152 could be configured to display information about the operating state of the system. In some cases, interface 152 could include one or more buttons for manual activation of an injection assembly and/or a corresponding control routine.

As already discussed, in some embodiments a manifold body can include electromechanical valves to automatically open and close fluid ports. In some embodiments, the electromechanical valves can be connected to (via wires or a wireless connection) control unit 156. Such a configuration would allow control unit 156 to send control signals for opening and closing particular valves.

Figure 3:
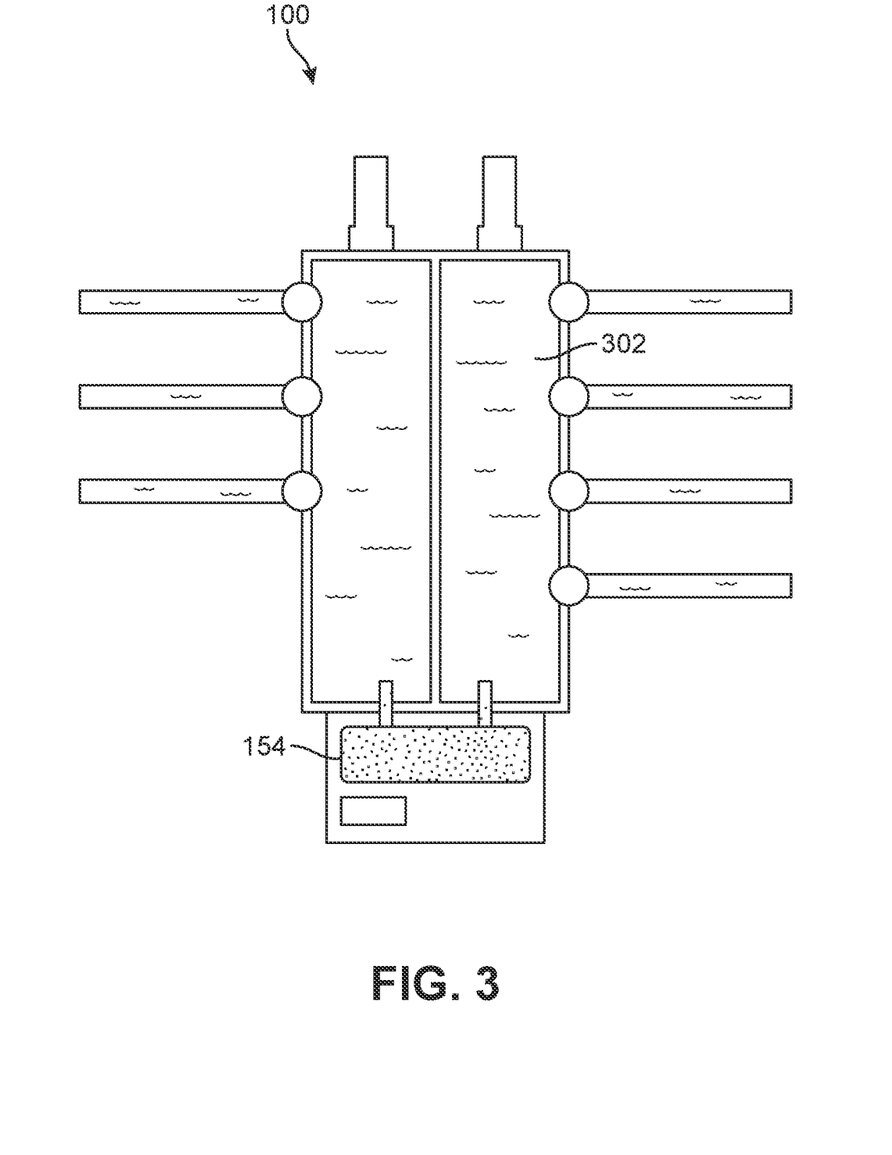
FIG. 3 is a schematic view of a water pipe manifold assembly filled with water, according to an embodiment.
Figure 4:
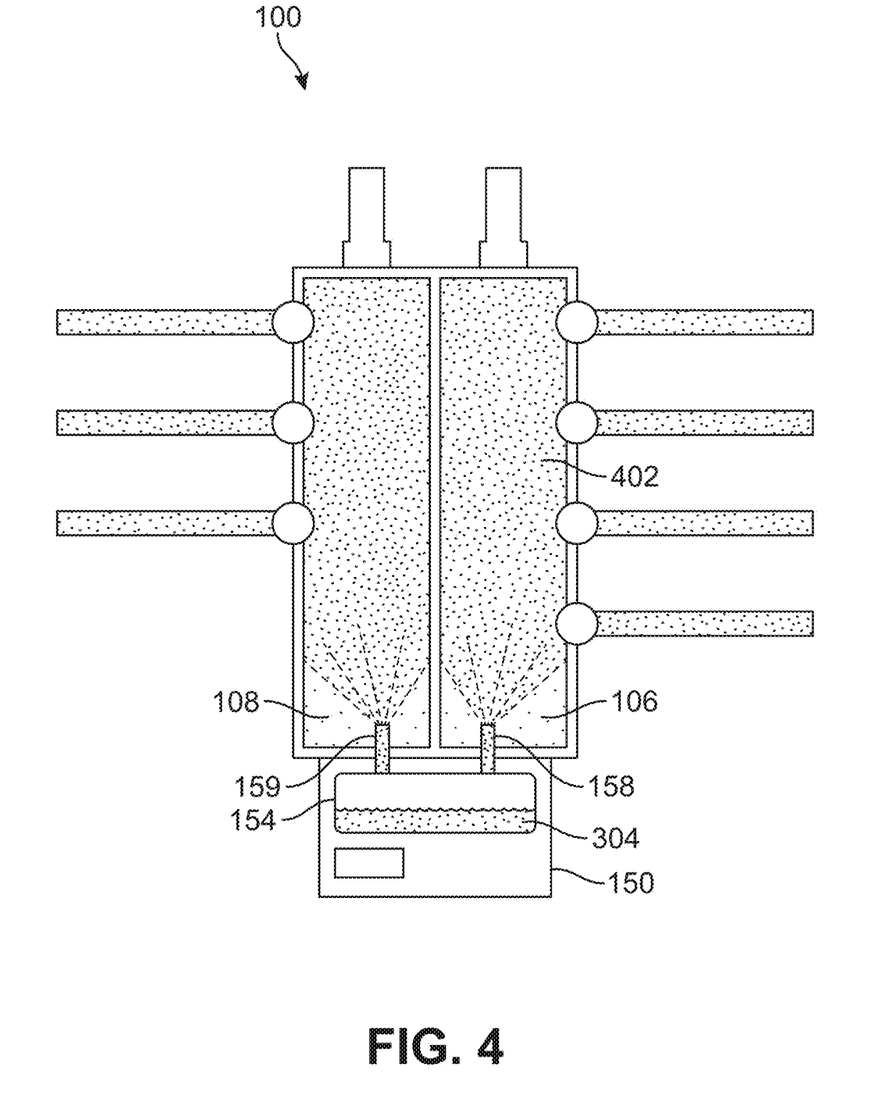
FIG. 4 is a schematic view of a water pipe manifold assembly with dyed water, according to an embodiment.

FIGS. 3 and 4 are schematic views showing the exemplary system in operation. In a first configuration of the system, shown in FIG. 3, manifold assembly 100 is filled with water 302. Specifically, water 302 is clear or transparent. In this configuration, reservoir 154 is filled with an aqueous solution including a dye 304 (or simply "dye 304").

When activated, injection device 150 may inject dye 304 into manifold assembly 100, as shown in FIG. 4. As shown in FIG. 4, first injector 158 injects dye from reservoir 154 into cold-water cavity 106. Likewise, second injector 159 injects dye from reservoir 154 into hot-water cavity 108. Once sufficient quantities of dye have been injected, cold-water cavity 106 and hot-water cavity 108 are both filled with dyed water 402. Dyed water 402 is then delivered to various components of the plumbing system via the fluid ports and associated pipes.

Figure 5:
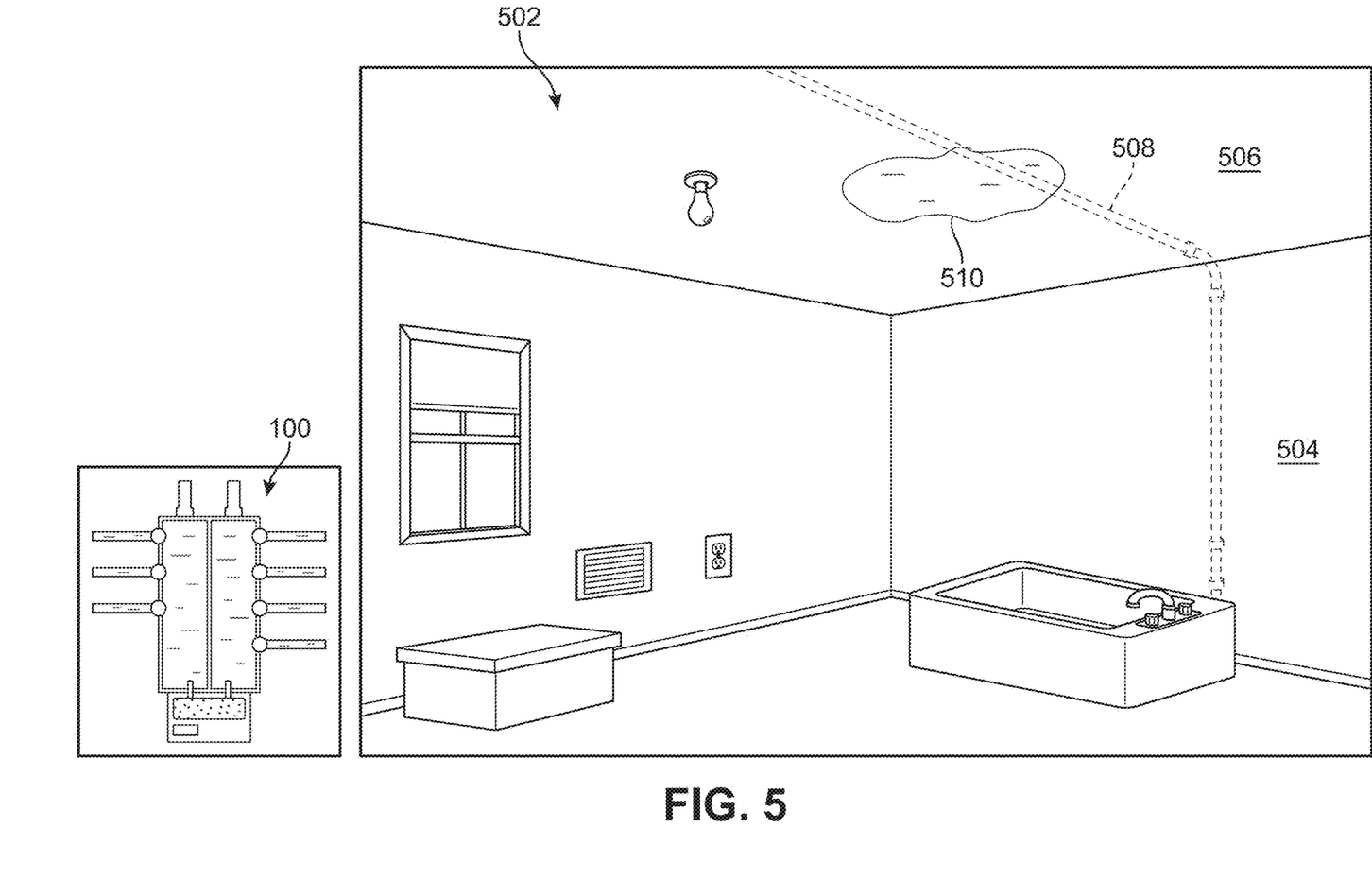
FIG. 5 is a schematic view of a room with visible water damage on a ceiling, according to an embodiment.
Figure 6:
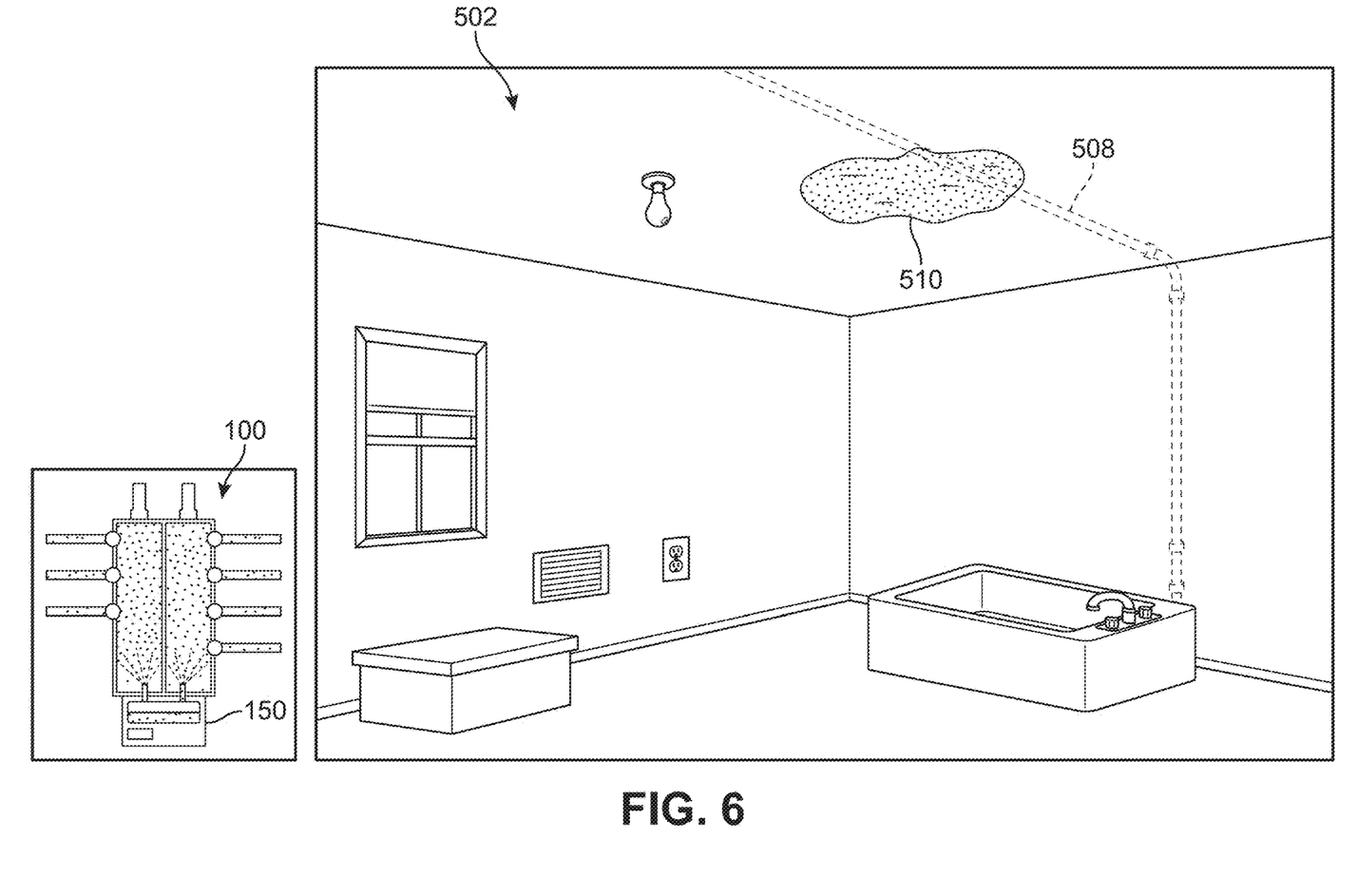
FIG. 6 is a schematic view of a room with visible water damage that has been colored by a dye, according to an embodiment.

FIGS. 5 and 6 illustrate a scenario where this system can be operated to provide a homeowner with useful information about possible water damage. As shown in FIGS. 5 and 6, a bathroom 502 includes a wall 504 and a ceiling 506. A pipe 508 (shown in phantom) runs behind part of wall 504 and part of ceiling 506. In this example, a wet spot 510 has developed on ceiling 506. At this point, the water comprising water spot 510 is clear, since no dye has yet been injected into manifold assembly 100.

To determine if water spot 510 is due to a leaking pipe or to some other cause, such as a leaking roof, a homeowner, plumber, or other party, may use the exemplary system to change the color of water in the plumbing system. As seen in FIG. 6, injection device 150 of manifold assembly 100 is used to inject dye into water within manifold assembly 100, thereby dying the water that travels through the plumbing system, including pipe 508. Because the water spot 510 is seen to have changed to the same color of the dye, the homeowner can be assured that the leak is coming from a pipe and not from a leak in the roof or other source.

Figure 7:
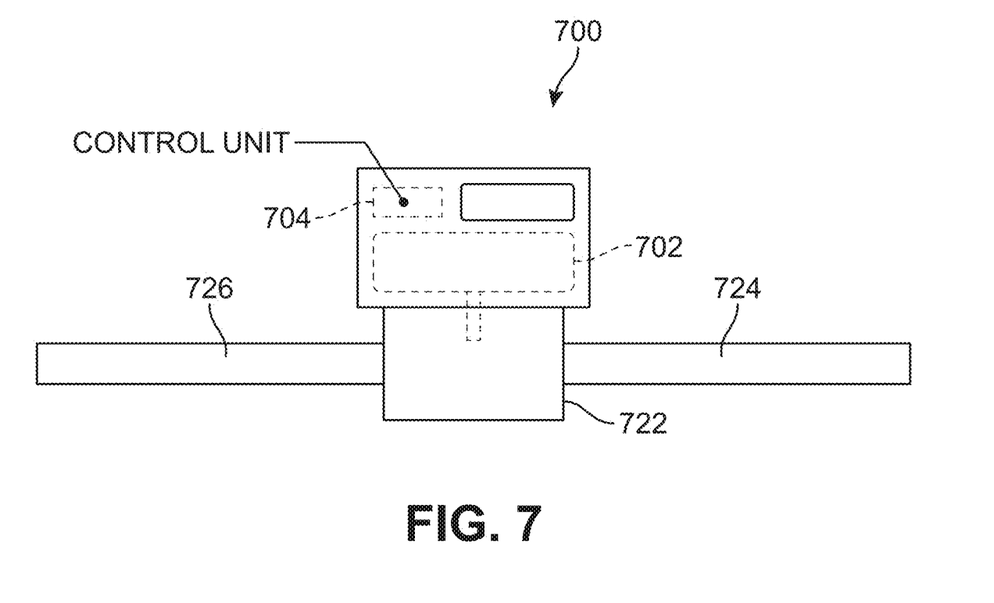
FIG. 7 is a schematic view of an injection device attached to a pipe, according to an embodiment.

FIG. 7 is a schematic view of another embodiment of an injection device 700. In this embodiment, rather than integrating an injection device into a manifold, injection device 700 may be used with a single pipe or series of connected pipes. Specifically, injection device 700 is attached to a pipe connector 722, which connects a first pipe portion 724 to a second pipe portion 726.

Injection device 700 may include a reservoir 702, a control unit 704, and a display 706. Further, an injector 708 may be in fluid communication with reservoir 702 and with an interior cavity associated with the interface of first pipe portion 724, second pipe portion 726, and pipe connector 722. This allows dye to be injected directly into water flowing through first pipe portion 724 and second pipe portion 726.

Figure 8A:
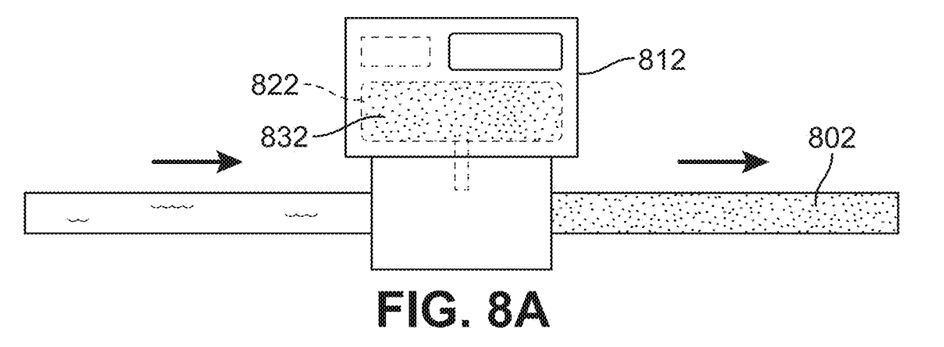
FIGS. 8A-8C are schematic views of several injection devices, each attached to a corresponding pipe, according to an embodiment.
Figure 8B:
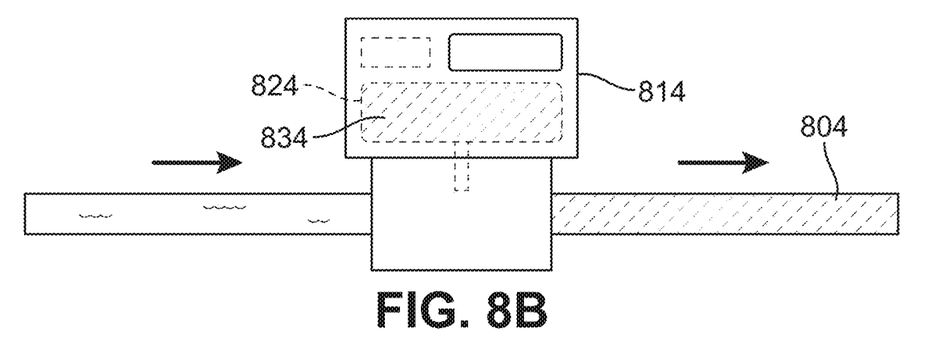
Figure 8C:
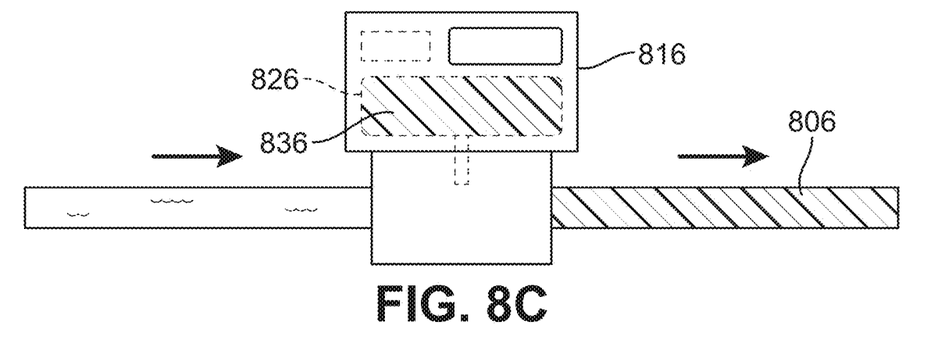

In yet another embodiment, depicted schematically in FIGS. 8A-8C, multiple pipes within the same plumbing system could be connected to a corresponding injection device. For example, a first pipe 802 may be attached to a first injection device 812 (FIG. 8A), a second pipe 804 may be attached to a second injection device 814 (FIG. 8B), and a third pipe 806 may be attached to a third injection device 816 (FIG. 8C).

Each injection device could be configured with a different colored dye. For example, first injection device 812 includes a reservoir 822 with first dye 832. Second injection device 814 includes a reservoir 824 with second dye 834. And third injection device 816 includes a reservoir 826 with a third dye 836.

In some embodiments, injectors associated with a hot-water cavity and a cold-water cavity could be independently actuated, so that dye is only added to one of either the hot-water cavity or the cold-water cavity at any given time.

Injection quantity can depend on concentration of dye. If a high concentration dye is used, the system could inject dye once a day or once every other day and still limit replacement.

In embodiments using a manifold with electronically actuatable valves, it may be possible to disperse dyed water to some pipes but not others. For example, if multiple pipes are run through an area in a house where there is water damage, it may be desirable to determine exactly which pipe is leaking without, for example, removing drywall. This could be done, for example, by dispersing dyed water to one pipe at a time.

A process for checking for leaks in one pipe at a time is disclosed. First, a manifold injection control unit (for example, control unit 156 in FIG. 1), could automatically select a pipe to check and then send a signal to close valves for all but the selected pipe. Only once the valves have been closed does the device inject dye into the manifold, thereby ensuring that if the dye becomes visible in any water damage the user will know exactly which pipe is leaking. Moreover, this process could be done for multiple pipes in sequence, thereby using a process of elimination to determine the leaking pipe.

In one embodiment, a dye injection into water in a manifold could be formulated to be harmless when consumed. In some cases, such a dye could be used in the plumbing system at all times, thereby allowing a leak to be detected at any time.

In other embodiments, dye could be injected at regular intervals, such as once a day or once every few days. This would help ensure leaks from pipes get detected sooner than later.

It may also be appreciated that the embodiments not only facilitate distinguishing water damage that may occur from leaked pipes vs other sources (such as a leaking roof), but the embodiments may also help aid users in detecting water damage in the first place. For example, depending on the type of substrate (drywall, carpet, etc.) and the color of the substrate, water damage may not be easily seen/detected. Using dyed water may increase the visibility of the water damage, even before it has spread significantly, thereby allowing for early detection before further damage occurs.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. Examples of media that can be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A water pipe manifold assembly configured for use in a plumbing system, comprising:
    a manifold body including an interior manifold cavity;
    a water inlet port in fluid communication with the interior manifold cavity;
    a first water outlet port in fluid communication with the interior manifold cavity;
    a second water outlet port in fluid communication with the interior manifold cavity;
    a manifold injection device attached to the manifold body, the manifold injection device further comprising:
        a reservoir filled with an aqueous solution including a dye; and
        an injection assembly having a first end in fluid communication with the reservoir and a second end in fluid communication with the interior manifold cavity;
    wherein the injection assembly injects the aqueous solution including the dye from the reservoir into the interior manifold cavity.

2. The water pipe manifold assembly according to claim 1, wherein the interior manifold cavity is further comprised of a hot-water cavity and a cold-water cavity and wherein the injection assembly includes a first injector in fluid communication with the hot-water cavity and a second injector in fluid communication with the cold-water cavity.

3. The water pipe manifold assembly according to claim 1, wherein the manifold injection device is actuated remotely.

4. The water pipe manifold assembly according to claim 3, wherein the manifold injection device is actuated using an application running on a mobile phone.

5. The water pipe manifold assembly according to claim 1, wherein the manifold injection device includes an actuating button configured for initiating injection of the aqueous solution including the dye into the interior manifold cavity.

6. The water pipe manifold assembly according to claim 1, wherein the manifold injection device is programmed to inject the aqueous solution including the dye into the manifold cavity at regular intervals.

7. The water pipe manifold assembly according to claim 1, wherein:
   the first water outlet port includes a first electrically controllable valve;
   the second water outlet port includes a second electrically controllable valve; and
   the manifold injection device includes a control unit capable of controlling the first electrically controllable valve and the second electrically controllable valve.

8. The water pipe manifold assembly according to claim 7, wherein the control unit operates the water pipe manifold assembly in a state where the first electrically controllable valve is open and the second electrically controllable valve is closed, and wherein the aqueous solution including the dye is injected into the interior manifold cavity while the water pipe manifold assembly is in the state.

9. A plumbing system, comprising:
   a first pipe having a first interior pipe cavity and a second pipe having a second interior pipe cavity;
   a first injection device comprising:
      a first reservoir filled with a first aqueous solution having a first dye; and
      a first injection assembly in fluid communication with the first interior pipe cavity; and
   a second injection device comprising:
      a second reservoir filled with a second aqueous solution having a second dye; and
      a second injection assembly in fluid communication with the second interior pipe cavity;
   wherein the first injection assembly injects the first aqueous solution with the first dye from the first reservoir into the first interior pipe cavity;
   wherein the second injection assembly injects the second aqueous solution with the second dye from the second reservoir into the second interior pipe cavity; and
   wherein the first dye has a different color than the second dye.

10. The plumbing system according to claim 9, wherein the first pipe is disposed adjacent to the second pipe.

11. The plumbing system according to claim 9, wherein the first injection device is remotely actuated.

12. The plumbing system according to claim 9, wherein the second injection device is remotely actuated.

13. The plumbing system according to claim 9, wherein the first injection device includes a button and wherein the first injection device is actuated using the button.

14. The plumbing system according to claim 9, wherein the second injection device includes a button and wherein the second injection device is actuated using the button.

15. The plumbing system according to claim 9, wherein the plumbing system includes a third pipe having a third interior pipe cavity and a third injection device, the third injection device further comprising:
   a third reservoir filled with a third aqueous solution having a third dye; and
   a third injection assembly in fluid communication with the third interior pipe cavity;
   wherein the third dye has a different color from the first dye and from the second dye.

* * * * *